Figure 1A:
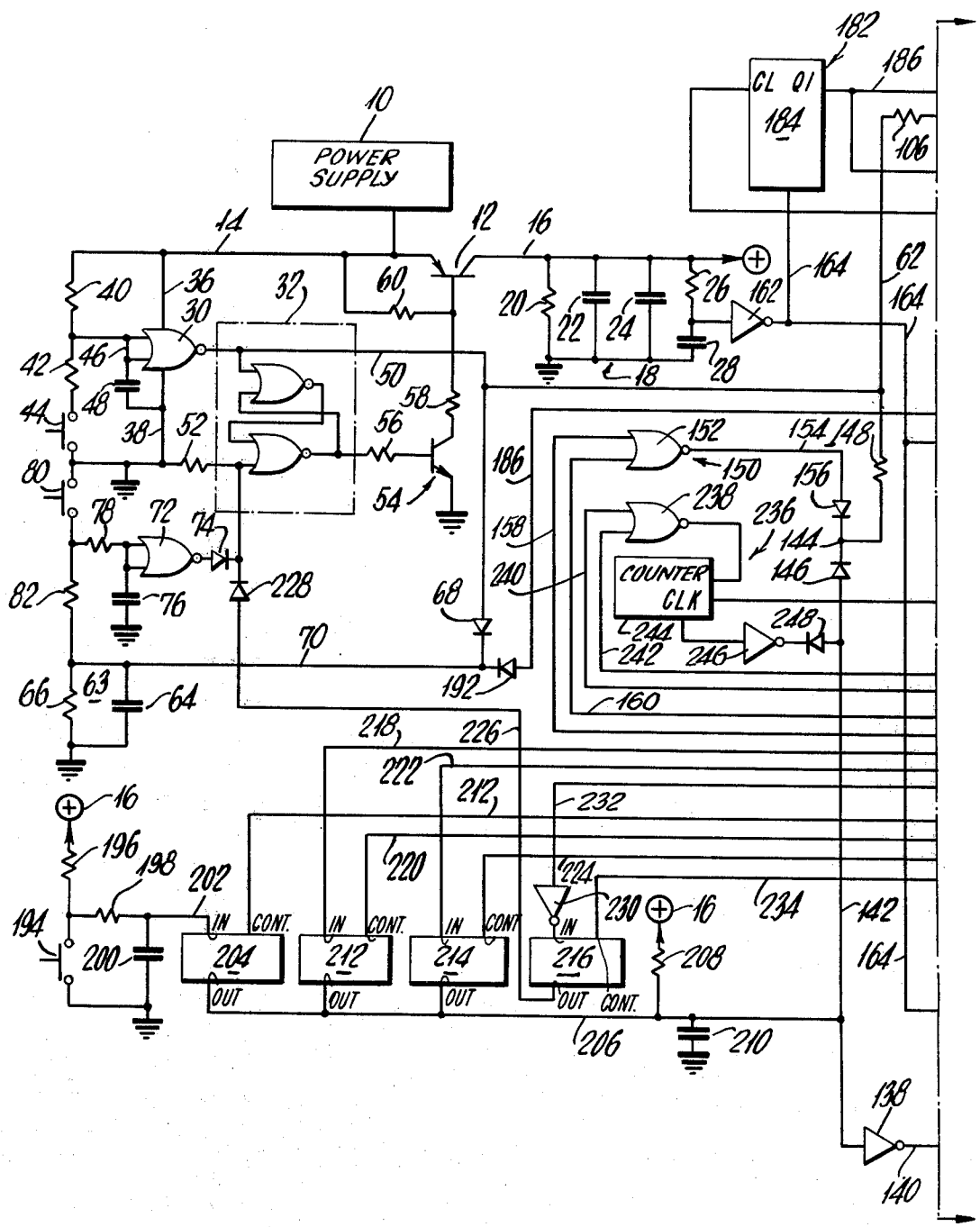

United States Patent [19]
Conklin et al.

[11] 4,048,621
[45] Sept. 13, 1977

[54] CODING SYSTEM FOR AN ALARM SYSTEM AND THE LIKE

[75] Inventors: Robert M. Conklin, Chappaqua, N.Y.; Arthur T. Human, Norwalk, Conn.

[73] Assignee: Holmes Protection Inc., New York, N.Y.

[21] Appl. No.: 667,786

[22] Filed: Mar. 17, 1976

[51] Int. Cl.[2] ............... H04Q 9/00; H03K 21/12
[52] U.S. Cl. .................... 340/168 B; 235/92 DE; 340/548; 340/164 R
[58] Field of Search ........ 340/168 R, 168 B, 147 MD, 340/164 R, 274, 345, 348, 353; 235/92 DE, 92 PE, 92 EA, 92 ST, 92 GT, 132 A

[56] References Cited
U.S. PATENT DOCUMENTS

| | | | |
|---|---|---|---|
| 3,244,369 | 4/1966 | Nassimbene | 235/92 DE |
| 3,496,563 | 2/1970 | Staples et al. | 340/348 |
| 3,893,073 | 7/1975 | Angello | 340/147 MD |
| 3,946,210 | 3/1976 | Fleisher | 235/92 DE |
| 3,967,095 | 6/1976 | Herring et al. | 235/92 EA |

OTHER PUBLICATIONS

"Six-Decade Counter for Industrial Systems" C. Clifford *New Electronics* vol. 8, No. 13, pp. 27, 30, June 24, 1975.

*Primary Examiner*—Donald J. Yusko
*Attorney, Agent, or Firm*—Wolder & Gross

[57] ABSTRACT

A system for registering and transmitting a preselected code to a receiving station which comprises a switch operable between open and closed states. An oscillator is responsive to the operation of the switch to the closed state for producing a pulse train. A control device is provided that has a plurality of states and is movable from state to state in response to an advance signal which is generated by an advance signal generator. The advance signal generator is operable by an energizing signal. A counter is connected to the oscillator for registering the number of pulses in response to one state of the control means. A transmitter is responsive to another state of the control means for connecting the oscillator to a transmission line. The counting means includes a generator for generating the energizing signal and for applying the same to the advance signal generator to change the state of control means when the number of pulses transmitted by the transmitting means is equal to the count registered in the counter.

16 Claims, 2 Drawing Figures

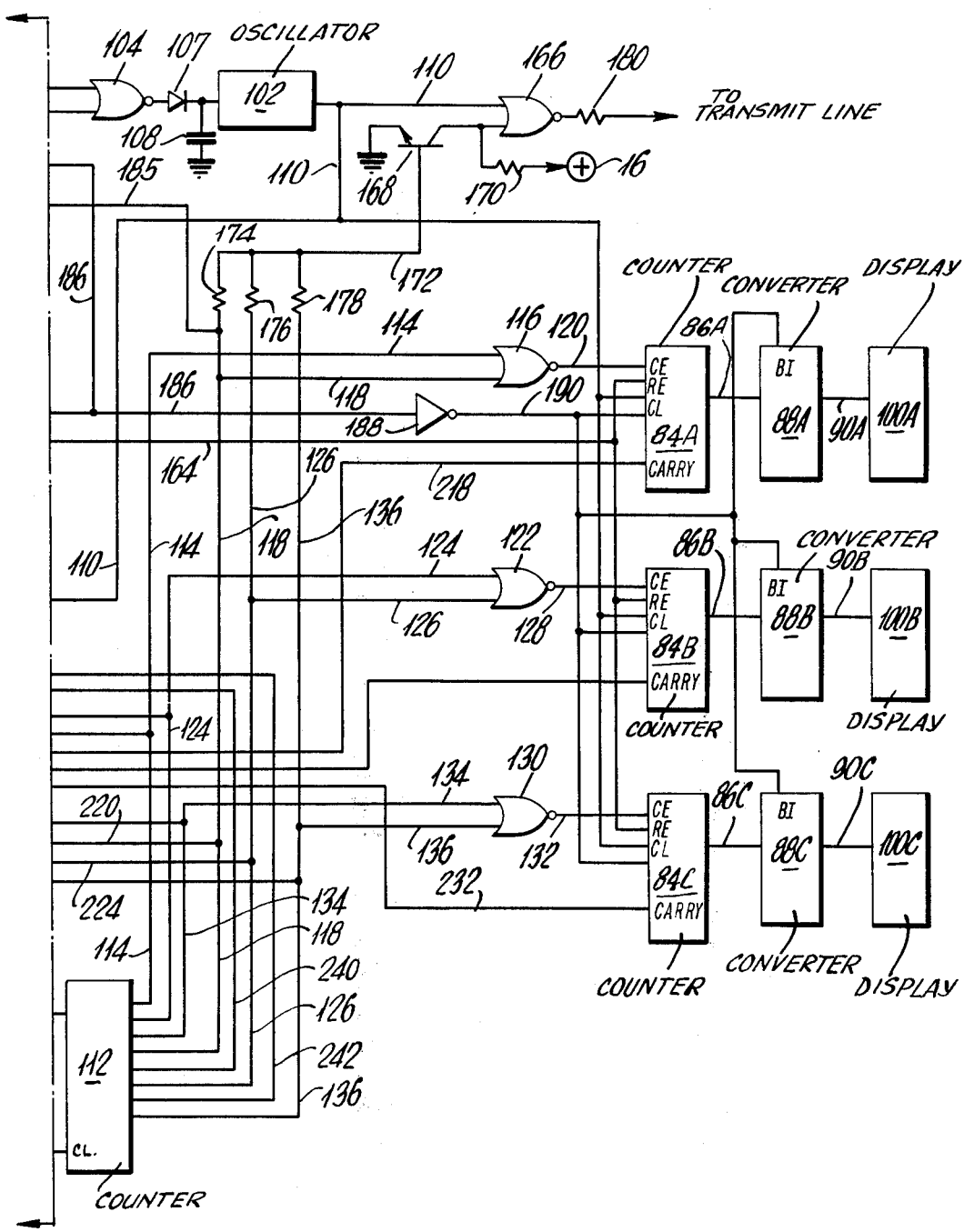

CODING SYSTEM FOR AN ALARM SYSTEM AND THE LIKE

The present invention relates generally to a coding system and, more particularly, pertains to a system for registering and transmitting a preselected code to a central receiving station of an alarm system.

At present, many burglar alarm systems include a central office that is connected to remote subscribers by telephone lines and the like. In operation, when a subscriber enters a protected premises, the subscriber must transmit a preselected code to the central office to prevent an alarm condition. That is, if the preselected code is not received within a predetermined time interval after entry onto the protected premises, an alarm will be produced at the receiving station.

The code usually comprises a plurality of decimal digits which are transmitted in the form of pulses equal in number to the particular code. That is, if the code to be transmitted is, for example, 32, three pulses will be transmitted followed by two pulses.

The subscriber produces the pulse code by depressing a button first three times and then two times. However, serious disadvantages are associated with this type of arrangement.

To be more specific, the subscriber may easily make an error in transmission and never realize the same. That is, instead of transmitting three pulses as the first digit, the subscriber may transmit four pulses, whereupon an alarm signal will be produced. Additionally, the inter-digit spacing is dependent solely upon operation of the pushbutton by the subscriber. Accordingly, if the second series of pulses follows too closely after the first series of pulses, the same may register as the single digit 5 at the central station, thereby again producing an alarm signal.

Accordingly, an object of the present invention is to provide an improved coding system for an alarm system.

A more specific object of this aspect of the invention is to provide a coding system in which a subscriber may visually observe the transmitted code.

A further object of the present invention is to provide a coding system for an alarm system which is accurate and reliable in operation.

Another object of the present invention resides in the novel details of the circuitry that provide a coding system of the type described, wherein a predetermined inter-digit spacing is automatically maintained.

Accordingly, a coding system for registering and transmitting a preselected code constructed according to the present invention comprises switch means operable between open and closed states and an oscillator that is responsive to the operation of the switch means to the closed state for producing a pulse train. An advance signal generator is provided for generating an advance signal in response to an energizing signal. Control means having a plurality of states is provided and is movable from state to state in response to the advance signal. Counting means is connected to the oscillator for registering the number of pulses in response to one state of the control means. Transmitting means is responsive to another state of the control means for connecting the oscillator to a transmission line. The counting means comprises an energizing signal generator for applying an energizing signal to the advance signal generator to change the state of the control means and thereby terminate transmission when the number of pulses transmitted by the transmitting means is equal to the count registered in the counting means.

Other features and advantages of the present invention will become more apparent from a consideration of the following description, when taken in conjunction with the accompanying drawings, in which:

FIGS. 1A and 1B when placed side by side is a schematic circuit wiring diagram of a coding system constructed according to the present invention.

Basically a system constructed according to the present invention essentially comprises a power section, a recording section and a transmitting section, the latter two sections being controlled by a central control device. Each one of these sections is described in detail hereinbelow.

POWER SECTION

The power section comprises a power supply 10 that is connected to the emitter electrode of a transistor 12 by a lead 14. The collector electrode of the transistor 12 is connected by a lead 16 to a filter network designated generally by the reference numeral 18. More specifically, the filter network comprises the parallel connection, between lead 16 and ground, of a resistor 20, capacitors 22 and 24, and a series circuit of a resistor 26 and a capacitor 28. The lead 16 is connected to the remainder of the elements in the circuit to provide power thereto. In the interests of clarity, the connections of the circuit elements to the lead 16 have been eliminated since these connections are conventional. Accordingly, when the transistor 12 is driven into conduction, the lead 16 will be connected to the power supply 10 to apply power to the circuit elements.

Conduction of the transistor 12 is controlled by a NOR gate 30 and a set/reset flip-flop 32. (As is conventional, a NOR gate will produce a high output only when all input signals thereto are low.) More specifically, the power terminals of the NOR gate are connected to the lead 14 and ground by respective leads 36 and 38. The lead 14 is connected to one input terminal of the gate 30 through a resistor 40. Similarly, the same input terminal of the gate 30 is connected to ground through the series circuit of a resistor 42 and a normally open pushbutton switch 44. The other input terminal of the gate 30 is connected to the first input terminal by a lead 46 and to the lead 38 through a capacitor 48. The output terminal of the gate 30 is connected by a lead 50 to one input terminal of the flip-flop 32. The other input terminal of the flip-flop 32 is connected to ground through a resistor 52. The output terminal of the flip-flop 32 is connected to the base electrode of a transistor 54 through resistor 56.

The emitter electrode of the transistor 54 is connected to ground and the collector electrode thereof is connected to the base electrode of the transistor 12 through a resistor 58. A resistor 60 also connects the base electrode of the transistor 12 to the lead 14.

In operation, when the button 44 is depressed, the input terminals of the gate 30 will be connected to ground through the resistor 42 and the closed contacts of the switch 44. Accordingly, the input signal to the gate 30 will be low thereby causing a high output signal to appear at the output terminals. Thus, a high signal will appear on the lead 62 connected to the lead 50 and the flip-flop 32 will toggle, thereby driving the transistor 54 into conduction. When the transistor 54 conducts, a conducting path will be provided for the base electrode of the transistor 12 thereby driving the transistor 12 into conduction and applying power to the lead 16, thereby to energize the circuit elements.

A time delay network 63 comprising the parallel circuit of a capacitor 64 and a resistor 66 is connected between the lead 50 and ground through a diode 68 and lead 70. The diode is polarized so that the anode electrode thereof is connected to the lead 50 and the cathode electrode thereof is connected to the network 63 via the lead 70. The time delay network 63 is provided as a safety precaution to reset the flip-flop 32 and thereby deenergize the circuit elements if the switch 44 remains in the open state for a predetermined interval of time. That is, if the subscriber releases the pushbutton 44 for a period of time sufficient to permit the capacitor 64 to discharge, the flip-flop 32 will be reset, thereby causing transistor 54 to become non-conducting.

Additionally, if the subscriber makes an error in entering a code into the system of the present invention, means are provided to permit the subscriber to cancel the entry and begin a new entry. More specifically, a NOR gate 72 is provided, the output terminals of which are connected to that input terminal of the flip-flop 32 connected to the resistor 52, through a diode 74. the diode 74 is polarized so that the anode electrode thereof is connected to the output terminals of the gate 72 and the cathode electrode is connected to the input terminal of the flip-flop 32. The input terminals of the gate 72 are connected together and to ground through a capacitor 76. Additionally, the input terminals are connected to ground through a series circuit comprising a resistor 78 and a normally open pushbutton 80. The junction of the resistor 78 and the switch 80 is connected to the lead 70 through a resistor 82.

When the pushbutton switch 80 is depressed, the signals at the input terminals of gate 72 will go low thereby producing a high output signal. This high output signal will be applied to the reset terminal of the flip-flop 32, thereby resetting the flip-flop and causing power to be removed from the circuit elements.

RECORDING SECTION

The recording section comprises counters 84A, 84B and 84C. The counters 84A-84C function to count the particular digit in the units, tens and hundreds columns of the code. However, it is to be noted that this is for illustrative purposes only and is not to be interpreted as being a limitation on the present invention. That is, the code may be more or less than three digits. The counters 84A-84C are conventional up/down counters which count the number of pulses applied to the clock terminal thereof and produce an output signal representative of the number of pulses counted in binary coded decimal code. That is, as is conventional, when a high signal is applied to the up/down terminal of the counters, the counters will count in the up direction. However, when a low signal is applied to the up/down terminal of the counters, the counters will count in the reverse or down direction. Additionally, when the count in the counters reaches zero, a low signal will be applied to the CARRY terminal of the counters. In this respect, the counters may be thought of as comprising a signal generator which generates a signal at the carry terminal when the count is zero.

Leads 86A-86C connect the respective counters 84A-84C to binary coded decimal to seven segment decimal display converters or drivers 88A-88C. Although single leads are shown, it is to be understood that a lead such as the lead 86A may comprise a number of wires such that the appropriate number of output terminals of the counter 84A is connected to the corresponding input terminals of the converter 88A. The converters or drivers are conventional in construction and convert the binary coded decimal signals applied to the input terminals into appropriate signals for reproducing the decimal digit by a seven-segment display. That is, if the signals at the output of the output of the counter 84A, for example, represent the decimal digit 3 in binary form, the output terminals of the converter 88A necessary for illuminating the segments which comprise the digit 3 will be energized. Connected to the converters 88A-88C by respective leads 90A-90C are the respective illuminated seven-segment displays 100A-100C. Again, it is to be understood that the leads 90A-90C represent a plurality of wires which connect the respective terminals of a converter to the corresponding input terminals of the display. The displays are operable to produce a visual indication of the digit stored in the respective counter.

The pulses which clock the respective counters are produced by an oscillator 102. More specifically, the lead 62 is connected from the lead 50 to an input terminal of a NOR gate 104 through a resistor 106. The output terminals of the gate 104 are connected to the input terminal of oscillator 102 through a diode 107 which is polarized so that the anode electrode thereof is connected to the output terminals of the gate 104. A capacitor 108 is connected between the cathode electrode of the diode and ground. When the system is energized so that a high signal appears on the lead 62, the output signal of the gate 104 will go low, thereby energizing the oscillator 102. The oscillator 102 produces approximately two pulses per second.

The output terminals of the oscillator 102 are connected by a clock line 110 to the clock input terminals CL of the respective counters 84A-84C. Accordingly, each time a clock pulse is received by the counter, the counter will be incremented by one digit.

Each one of the units, tens and hundreds counters 84A-84C, respectively, is gated in sequence by a central control comprising a digital counter 112. In other words, the counter 112 may be thought of as a control device that controls the operations of the present system. As is conventional, the counter 112 is provided with ten output terminals. In response to a clock pulse, a high signal will appear at each output terminal in sequence. That is, upon receiving the reset signal, a high output will appear at the 0 output terminal of counter 112. When the clock signal is received, a high signal will appear at the 1 output terminal of the counter and the 0 output terminal will go low. This will continue in sequence at the remainder of the output terminals of the counter.

The 0 output terminal of the counter is connected by a lead 114 to one input terminal of a NOR gate 116. The other input terminal of the NOR gate 116 is connected to output terminal 3 of the counter 112 by a lead 118. The output terminals of the NOR gate 116 are connected to the clock enable input terminal CE of the counter 84A by a lead 120. When the signal at the CE terminal of the counter 84A goes low, the counter will be enabled to count clock pulses. This will occur whenever a high signal is applied to the lead 114 or the lead 118.

In a similar manner, the counter 112 and a NOR gate 122 control the operation of the counter 84B. More specifically, the two input terminals of the NOR gate 122 are connected to the 1 output terminal and the 5 output terminal of the counter 112 by respective leads 124 and 126. If a high signal is present at either the 1 or 5 output terminal of the counter 112, a low signal will appear at the output terminals of the gate 122 (which terminals are connected to the clock enable CE terminal of the counter 84B by a lead 128) thereby enabling the counter 84B to count clock pulses.

Additionally, the output terminals of a NOR gate 130 are connected by a lead 132 to the clock enable CE terminals of the counter 84C. The two input terminals of the gate 130 are connected to the 2 and 7 output terminals of the counter 112 by respective leads 134 and 136. Thus, if a high signal appears on either lead 134 or 136, the counter 84C will enabled to count clock pulses.

The clock terminal CL of the counter 112 is connected to the output terminal of an inverter 138 by a lead 140. The input terminals of the inverter 138 are connected by a lead 142 to a junction 144. Serially connected in the lead 142 between the input terminals of the inverter 138 and the junction 144 is a diode 146 which is polarized so that the anode electrode thereof is connected to the input terminals of the inverter 138. Also connected to the junction 144, through a resistor 148 is the lead 62. A steering circuit, designated generally by the reference character 150, is also connected to the junction 144. More specifically, the steering circuit 150 comprises a NOR gate 152, the output terminals of which are connected by a lead 154 to the junction 144 through a diode 156. The diode 156 is polarized so that the anode electrode thereof is connected to the output terminals of the gate 152. One input terminal of the two-terminal gate 152 is connected by a lead 158 to the lead 114. The other input terminal to the gate 152 is connected by a lead 160 to the lead 124. Accordingly, if a high signal is present on either the lead 114 or the lead 124, a low signal will appear at the output terminals of the gate 152.

Connected between the resistor 26 and the capacitor 28 of the filter 18 in the power section are the input terminals of an inverter 162. The output terminals of the inverter 162 are connected by a reset line 164 to the reset terminals of the logic elements. That is, the lead 164 is connected to the "reset" terminal of the counter 112 and to the reset terminals RE of the counters 84A-84C.

In operation, it will be assumed that the subscriber utilizing the system of the present invention wishes to record and transmit the code 312. Accordingly, upon depressing the pushbutton 44, the flip-flop 32 will toggle thereby placing an energizing signal on the lead 16 and a high signal on the lead 62, as noted hereinabove. As the capacitor 28 begins to initially charge, a high signal will appear on the lead 164 thereby resetting the counters 84A-84C and the counter 112. Thus, a high signal will appear on the lead 114 which is connected to the 0 output terminal of the counter 112, thereby causing a low signal to appear on the lead 120, connected to the output terminals of the NOR gate 116. Thus, the counter 84A will be enabled to count clock pulses. Since low signals will be present at the input terminals to the respective NOR gates 122 and 130, the counters 84B and 84C respectively associated therewith will be inhibited.

The high signal on the lead 62 will cause a low signal to appear at the output terminals of the NOR gate 104 thereby energizing the oscillator 102 to produce a pulse train. The pulses are applied via lead 110 to the clock input terminal of the counter 84A so that the counter begins counting in the up direction. The output signals at the counter 84A will be applied to the binary coded decimal to seven-segment converter 88A which, in turn, produces a visual indication of the decimal digit stored in the counter 84A via the display 100A. The subscriber maintains the pushbutton 44 depressed until he observes the digit 2 on the display 100A, thereby indicating that the correct units digit has been stored or registered in the counter 84A. The subscriber then releases the pushbutton which causes the signal at the output of the NOR gate 30 in the power section to go low. Hence, the signal on the lead 62 will now go low. However, the elements will remain energized since the flip-flop 32 is still in the "set" state. If, however, the subscriber made an error and entered a digit other than 2 into the counter 84A, the subscriber would depress the cancel button 80 and thereby de-energize the entire unit by resetting the flip-flop 32. Moreover, the subscriber can depress the button 80 at any time to cancel recording of the code or transmitting of the code.

The high signal on the lead 114 is applied to the input terminal of the NOR gate 152 via the lead 158. Accordingly, a low signal will appear at the output terminals of the NOR gate 152. However, when the pushbutton 44 is depressed, the junction 144 will remain high since the signal on the lead 62 is high. However, when the pushbutton 44 is released, the signal at the junction 144 goes low. The inverter 138 inverts this low signal and produces a high signal on the lead 140 which clocks the counter 112, thereby causing a high signal to appear at the 1 output terminal of the counter and a low signal to appear at all the remaining output terminals of the counter. As a result, low signals will be applied to both input terminals of the NOR gate 116 to cause a high signal to appear at the CE terminal of the counter 84A to inhibit the counter. On the other hand, a high signal will appear on the lead 124 thereby causing a low signal to appear on the lead 128 and enabling the counter 84B.

When the subscriber again depresses the count pushbutton 44, a high signal will appear on the lead 62 thereby energizing the oscillator 102 and clock pulses or a pulse train will now appear on the lead 110. The counter 84B will now count these pulses and cause the digit stored therein to be displaced on the display 100B. When the subscriber observes that the 1 tens digit has been stored in the display 100B, he then releases the pushbutton 44. This action again deenergizes the oscillator 102 to eliminate further counting. Additionally, since a high signal is applied to the other input terminal of the steering circuit NOR gate 152 via the leads 124 and 160, the junction 144 will again go low when the signal on the lead 62 goes low in response to the release of the pushbutton switch. Therefore, the counter 112 will again be clocked to cause a high signal to appear on the 2 terminal of the counter and a low signal to appear at the remaining output terminals.

Since a high signal appears on the lead 134, the counter 84C will now be enabled whereas the counters 84A and 84B will be inhibited. Upon depression of the pushbutton 44, the oscillator 102 will be energized to operate the counter 84C. When the subscriber observes (via the display 100C) that the hundreds digit 3 has been stored in the counter 84C, he releases the pushbutton 44. A low signal now appears on the lead 62 thereby deenergizing the oscillator 102. However, since the signals on the leads 158 and 160 are both low, a high signal will appear at the output terminals of the NOR gate 152 thereby maintaining a high signal at the junction 144 regardless of the signal appearing on the lead 62. Thus, no clock signal will be applied to the counter 112 due to the release of the pushbutton 44.

Assuming that the subscriber does not immediately place the system in the transmit mode in the manner indicated below, after a preselected time interval determined by the time delay network 63, the flip-flop 32 will be reset. This arrangement provides an added safety feature in that it does not permit unauthorized personnel to view the code on the displays 100A-100C. That is, if the system is not placed in the transmit mode within a preselected interval of time, the system will be deenergized and the displays 100A-100C will become blank.

TRANSMIT SECTION

A number of elements are common to both the recording and transmitting sections. For example, the counter 112 and the associated control NOR gates are common to both sections and provide a central control for both the recording and transmitting sections.

In addition to the common elements, the transmitting section includes a NOR gate 166, one input terminal of which is connected to the output terminals of the oscillator 102 via the clock line 110. The other input terminal of the NOR gate 166 is connected to the collector electrode of a transistor 168, the emitter electrode of which is connected to ground. The transistor bias is obtained by connecting the collector electrode to the power lead 16 through a resistor 170. The base electrode of the transistor 168 is connected by a lead 172 to the leads 118, 126 and 136 through respective resistors 174, 176 and 178. The output terminals of the gate 166 are connected to a transmit line through a resistor 180. When the transistor 168 is driven into conduction by a high signal appearing of the leads 118, 126 or 136, the pulses appearing on the lead 110 from the oscillator 102 will be transmitted via the NOR gate 166 to the transmit line.

When the system is placed in the transmit mode, it remains in the transmit mode by a latch designated generally by the reference character 182. More specifically, the latch 182 functions as a JK flip-flop 184, the clock terminal CL of which is connected to the lead 118 by a lead 185. The Q1 output terminal of the flip-flop 184 is connected by a lead 186 to one input terminal of the NOR gate 104. The lead 186 is also connected to the input terminals of an inverter 188, the output terminals of which are connected by a lead 190 to the "up/down" terminal of the counters 84A-84C. Additionally, the lead 190 is connected to the bit inhibit terminal BI of the converters 88A-88C.

The lead 186 is also connected to the lead 70 through a diode 192, the cathode electrode of which is connected to the lead 70. The reset line 164 is connected to the "reset" terminal of the flip-flop 182. Accordingly, the flip-flop 182 will be reset along with the remainder of the other logic elements when the system is initially energized.

The transmit mode of the system is initiated by depressing a normally open pushbutton switch 194. That is, one terminal of the switch 194 is connected to ground and the other terminal is connected to the power lead 16 through a resistor 196. The junction of the resistor 196 and the switch 194 is connected through a resistor 198 to one end of a capacitor 200, the other end of which is connected to ground. The junction of the resistor 198 and the capacitor 200 is connected to the IN terminal by a lead 202 of a so-called solid state or analog switch 204. The switch 204 is conventional in construction and operates in the following manner. When a high signal is applied to a control terminal CONT., whatever signal appears at the input terminal IN of the switch will also appear at the output terminal OUT of the switch. Thus, if the input terminal IN of the switch is grounded, then a ground signal will appear at the output terminal OUT when a high signal is applied to the control terminal CONT. The output terminal OUT of the switch 204 is connected by a lead 206 to the lead 142. The lead 206 is connected to the power lead 16 through a resistor 208. Additionally, the lead 206 is connected to ground through a capacitor 210. The control terminal CONT. of the switch 204 is connected by a lead 212 to the lead 134.

The lead 206 is also connected to the output terminals OUT of solid-state switches 212 and 214. The input terminal IN of the switch 212 is connected by a lead 218 to the CARRY terminal of the counter 84A. The control terminal CONT. of the switch 212 is connected by a lead 220 to the lead 118. In a similar manner, the input terminal IN of the switch 214 is connected by a lead 222 to the CARRY terminal of the counter 84B. The control terminal CONT. of the switch 214 is connected by a lead 224 to the lead 126.

Additionally, a solid-state switch 216 is provided having an output terminal OUT which is connected by a lead 226 to the reset terminal of the flip-flop 32 through a diode 228. That is, the anode electrode of the diode 228 is connected to the output terminal of the switch 216 and the cathode electrode of the diode is connected to that terminal of the flip-flop 32 which is connected to the resistor 52. The input terminal IN of the switch 216 is connected to the output terminals of an inverter 230, the input terminals of which are connected by a lead 232 to the CARRY terminal of the counter 84C. The control terminal CONT. of the switch 216 is connected by a lead 234 to the lead 136.

To insure that there is a uniform spacing between the digits when the same are transmitted, a spacing circuit designated generally by the reference number 236 is provided. The circuit 236 comprises a NOR gate 238, one input terminal of which is connected by a lead 240 to the 4 output terminal of the counter 112. The other input terminal of the gate 238 is connected by a lead 242 to the 6 output terminal of the counter 112. The output terminals of the NOR gate 238 are connected to the "reset" terminal of a counter 244. The 4 output terminal of the counter 244 is connected to the input terminals of an inverter 246, the output terminals of which are connected to the lead 142 through a diode 248. The diode is polarized so that the anode electrode thereof is connected to the lead 142. Additionally, the clock line 110 is connected to the clock input terminal CLK of the counter 244. When a high signal appears on either one of the leads 240 or 242, the low signal appearing at the output terminals of the gate 238 will release the counter 244 from being held in reset. After four pulses have been received by the counter on the clock line 110, a high output signal will appear at the 4 output terminal of the counter, thereby causing a low signal to appear at the output terminals of the inverter 246, which low signal is applied to the lead 142.

When it is desired to place the system in the transmit mode, after the correct code has been loaded into the recording section, the pushbutton 194 is depressed. At this point, it will be noted that the signal on the lead 134 is high. That is, as previously stated, upon release of the pushbutton 44 after the hundreds digit has been loaded into the recording section, the junction 144 will remain high since both signals to the input terminals of the NOR gate 152 are low. This arrangement permits both two and three digit codes to be used since the hundreds counter does not necessarily have to be loaded with a number. Accordingly, no further clock signals will be applied to the counter 112 until the transmit pushbutton 194 is depressed. When the pushbutton is depressed, ground will be applied to the lead 202 which will be transmitted, through the switch 204 to the lead 206. This ground signal will therefore appear at the input terminals of the inverter 138 and produce a high signal at the output thereof which will clock the counter 112. A high signal will therefore appear at the 3 output terminal of the counter 112. This high signal will be applied via the leads 118 and 185 to the flip-flop 184 thereby setting the flip-flop. Accordingly, a high signal will now appear on the lead 186 which produces three results. In the first place, the high signal on the lead 186 causes a low signal to appear at the output terminals of the gate 104 thereby energizing the oscillator 102 to produce a continuing pulse train on the clock line 110. Additionally, this high signal is applied to the input terminals of the inverter 188 thereby causing a low signal to appear on the lead 190. This low signal is applied to the "up/down" terminals of the counters 84A–84C, thereby causing the counters to count in the down direction. Additionally, this low signal is applied to the bit inhibit terminals BI of the converters 88A–88C. This action removes the digits from the displays 100A–100C. Thus, all the operator need do is depress the transmit button 194 and the code will immediately disappear from the displays thereby preventing unauthorized personnel from viewing the code once the system has been placed in the transmit mode.

Additionally, the high signal on the lead 186 is applied to the lead 70 through the diode 192. This prevents operation of the time delay network 63 which, in turn, prevents resetting of the flip-flop 32 by the time delay network during a transmission cycle.

The high signal on the lead 118 will also be applied to the base electrode of the transistor 168 through the lead 172, thereby applying a low signal to one input terminal of the NOR gate 166. Hence, the output signal at the NOR gate 166 will now follow the pulses on the lead 110, so that effectively, the pulses on the clock line will be applied to the transmit line.

Moreover, the high signal on the lead 118 will be applied to the NOR gate 116 thereby causing a low signal to appear at the clock enable terminal CE of the counter 84A to enable the counter. The pulses appearing on the clock line 110 will now be counted by the counter 84A in the down direction. Since the oscillator pulses are simultaneously applied to the counter 84A and the NOR gate 166, it will be obvious that each pulse transmitted to the transmit line will be counted by the counter 84A.

The counter 84A will continue to count in the down direction until a zero count is reached at which time the signal at the CARRY terminal of the counter will go low. This low signal is applied to the input terminal IN of the solid-state switch 212. Since the lead 220 is connected to the lead 118, a high signal will appear at the control terminal CONT. of the switch 212. Therefore, the low signal on the lead 218 will be connected through to the lead 206 thereby clocking the counter 112. At this point, the signal at the 4 output terminal of the counter will go high and the signals at all the remaining terminals will go low. Thus, a high signal will appear on the lead 240. Since a low signal now appears on the lead 118, the counter 84A will be inhibited. Moreover, the transistor 168 will be rendered non-conducting whereby a high signal will continuously be applied to one input terminal of the gate 166, thereby preventing transmission of the pulses on the lead 110.

The high signal on the lead 240 will cause a low signal to appear at the output terminals of the gate 238, thereby resetting the counter 244. Since the oscillator 102 continues to produce a pulse train due to the latching effect of the flip-flop 184, the counter 244 will now begin to count pulses. After four pulses have been received, a high signal will appear at the 4 output terminal of the counter 244 thereby causing a low signal to appear at the output terminals of the invention 246. When the signal on the lead 142 goes low, the counter 112 will again be clocked in the manner noted above. Thus, a high signal will now appear at the 5 output terminal of the counter 112 and the signals at the remaining terminals will go low.

A high signal will now appear on the lead 126 which will be applied to the base electrode of the transmitter 168 via the lead 172, thereby enabling the NOR gate 166 to again transmit the pulses on the lead 110. Additionally, the high signal on the lead 126 will enable the NOR gate 122 and thereby enable the counter 84B to begin counting in the down direction. This count will continue until the counter 84B reaches a zero count at which time a low signal will appear on the lead 222 which is connected to the "CARRY" terminal of the counter 84B. This signal will again be transmitted to the lead 206 through the switch 214 in view of the fact that the control terminal thereof is connected to the lead 126 via the lead 224. The counter 122 will again be clocked whereby a high signal will appear at the 6 output terminal of the counter and the signal at the remaining terminals will go low.

Thus, a high signal will appear on the lead 242 which will cause the signal at the output terminals of the NOR gate 238 to go low and reset the counter 244. After four pulses have been received from the clock line 110, the counter 112 again will be clocked in the manner indicated above. Hence, a high signal will appear at the 7 output terminal of the counter and the signals at the remaining terminals will go low. This will cause a high signal to appear on the lead 136 and thereby drive the transistor 168 into conduction to permit transmission of pulses. Additionally, the high signal on the lead 136 will cause a low signal to appear at the output terminals of the NOR gate 130, thereby enabling the counter 84C to begin counting pulses in the down direction. This action will continue until a zero count is reached at which time the signal at the CARRY terminals of the counter will go low, thereby applying a low signal to the input terminal of the inverter 230 via the lead 232. Assuming a two-digit was used, the hundreds counter would be at 0 and the low output signal on the CARRY terminal would reset immediately. Since a high signal is present at the control terminals of the switch 216 via the leads 136 and 234, the high signal appearing at the output terminals of the inverter 230 will pass through the switch and be applied to the reset terminal of the flip-flop 32 via the lead 226 and a series connected diode 228. This action will reset the flip-flop 32 thereby deenergizing the system.

From a consideration of the above, it will be noted that a uniform spacing is maintained between the digits comprising the code. That is, in the illustrative example, the transmission of each successive digit comprising the code will be delayed by a time interval equal to four pulses since the counter 244 must receive four pulses before it operates to cause clocking of the counter 112.

Accordingly, a coding system for an alarm system or the like has been disclosed which is efficient and reliable in operation and which eliminates errors normally produced by manual systems. Moreover, this particular system has the advantage of not requiring a multitude of pushbuttons such as a calculator keyboard, and yet permitting efficient, reliable establishment of a valid code.

While a preferred embodiment of the invention has been shown and described herein, it will be obvious that numerous omissions, changes and additions may be made in such embodiment without departing from the spirit and scope of the present invention.

What is claimed is:

1. A system for registering and transmitting a preselected code to a receiving station comprising switch means operable between open and closed states; an oscillator responsive to the operation of said switch means to the closed state for producing a pulse train; an advance signal generator for generating an advance signal in response to an energizing signal; control means having a plurality of states and being movable from state to state in response to said advance signal; counting means connected to said oscillator for registering the number of pulses in response to one state of said controlled means; transmitting means responsive to another state of said control means for connecting said oscillator to a transmission line; said counting means comprising energizing signal generating means for applying an energizing signal to said advance signal generator to change the state of said control means when the number of pulses transmitted by said transmitting means is equal to the count registered in said counting means.

2. A system as in claim 1, and display means connected to said counting means for displaying the count registered therein.

3. A system as in claim 2, in which said control means comprises disabling means responsive to said other state of control means for disabling said display means.

4. A system as in claim 1, and timing means responsive to said open state of said switch means for disabling said system after a preselected period of time.

5. A system as in claim 1, in which said counting means comprises means for counting pulses in a first direction in response to said one state of said control means, and in the opposite direction in response to said other state of said control means; said energizing signal generating means being operable to generate said energizing signal when the count is zero.

6. A system as in claim 5, in which said counting means comprises an up/down counter.

7. A system as in claim 1, in which said counting means comprises at least a units and a tens counter, first gate means responsive to a first state of said control means for connecting said oscillator with said units counter, and a second gate responsive to a second state of said control means for connecting said oscillator with said tens counter.

8. A system as in claim 7, in which said first gate means is responsive to a third state of said control means and said second gate is responsive to a fourth state of said control means for connecting said oscillator with said respective units and tens counters; said units and tens counters being responsive to said third and fourth states, respectively, to count in a direction opposite to the counting direction when said control means is in said first and second states, and spacing means responsive to a zero count in said units counter for preventing counting by said tens counter until a preselected number of pulses have been transmitted by said transmitting means.

9. A system as in claim 1, in which said control means comprises latching means for producing a latch signal when said control means is in said other state to maintain said oscillator energized.

10. A system as in claim 1, in which said control means comprises a decade counter.

11. A system for registering and transmitting a preselected code to a receiving station comprising switch means operable between open and closed states; an oscillator responsive to the operation of said switch means to said closed state for producing a plurality of pulses; an advance signal generator for generating an advance signal when said switch means is operated to the open state; control means having a plurality of states and being moved from state to state in response to said advance signals; bi-directional counting means connected to said oscillator for counting and registering said pulses in a first direction in response to a one state of said control means and in the opposite direction in response to another state of said control means; said counting means generating a signal at an output terminal when the count therein is zero; display means for displaying the count registered in said counting means; transmitting means responsive to said other state of said control means for connecting said oscillator to a transmission line; and lead means connecting said counting means output terminal to said advance signal generator for generating an advance signal to terminate the operation of said transmitting means when a signal is present at said output terminal.

12. A system for registering and transmitting a preselected code to a receiving station comprising register means under control of an operator for registering said preselected code, a central character display connected to said register means for displaying said preselected code, transmitting means for transmitting the contents of said register means to the receiving station, and inhibit means responsive to the operation of said transmitting means for inhibiting operation of said display upon initiation and during transmission of said register means contents.

13. A system as in claim 12, in which said register means comprises a plurality of counters, and a selectively operable oscillator for supplying pulses to said plurality of counters of increment said counters in response to each of said pulses.

14. A system as in claim 13, and control means for sequentially connecting each of said plurality of counters to said oscillator.

15. A system as in claim 13, in which said plurality of counters are each up/down counters.

16. A system as in claim 15, in which said inhibit means is connected to said plurality of counters for supplying a signal thereto to operate said counters in said down direction during transmission of said preselected code.

* * * * *